US009476415B2

(12) United States Patent
Sivaramakrishnan et al.

(10) Patent No.: US 9,476,415 B2
(45) Date of Patent: Oct. 25, 2016

(54) SYSTEM AND METHOD FOR CONTROLLING MOTION PROFILE OF PISTONS

(71) Applicant: General Electric Company, Schenectady, NY (US)

(72) Inventors: Shyam Sivaramakrishnan, Schenectady, NY (US); Todd Alan Anderson, Niskayuna, NY (US); Matthew David d'Artenay, San Marcos, CA (US); Dean David Marschke, Eden Prairie, MN (US)

(73) Assignee: General Electric Company, Niskayuna, NY (US)

( * ) Notice: Subject to any disclaimer, the term of this patent is extended or adjusted under 35 U.S.C. 154(b) by 645 days.

(21) Appl. No.: 13/711,966

(22) Filed: Dec. 12, 2012

(65) Prior Publication Data

US 2014/0161627 A1    Jun. 12, 2014

(51) Int. Cl.
*F04B 49/00*    (2006.01)
*F04B 9/117*    (2006.01)
(Continued)

(52) U.S. Cl.
CPC ............. *F04B 23/06* (2013.01); *F04B 9/1172* (2013.01); *F04B 9/1178* (2013.01); *F04B 49/002* (2013.01); *F04B 49/22* (2013.01); *B01D 61/02* (2013.01)

(58) Field of Classification Search
CPC ................ B01D 61/06; B01D 61/025; B01D 2313/243; B01D 2313/246; F04B 9/113; F04B 49/002; F04B 49/1172; F04B 9/1172; F04B 9/1178; F04B 49/22; F04B 23/06; G01N 2030/326

USPC .................................... 417/2, 18, 22, 53, 46
See application file for complete search history.

(56) References Cited

U.S. PATENT DOCUMENTS 3,833,200 A    9/1974   McCombs, Jr.
3,941,154 A    3/1976   Bishop
(Continued)

FOREIGN PATENT DOCUMENTS

CN    2716251 Y    8/2005
CN    1721047 A    1/2006
(Continued)

OTHER PUBLICATIONS

International Search Report and Written Opinion issued in connection with corresponding PCT Application No. PCT/US2013/071829 on Mar. 17, 2014.
(Continued)

*Primary Examiner* — Charles Freay
*Assistant Examiner* — Nathan Zollinger
(74) *Attorney, Agent, or Firm* — Mary Louise Stanford

(57) ABSTRACT

A method includes driving a fluid pumping unit having a plurality of pumping cylinders via a plurality of hydraulic cylinders respectively of a hydraulic power unit. The method further includes controlling activation of the hydraulic power unit such that each stroke of the corresponding piston assembly between the top dead center and the bottom dead center follows a corresponding trapezoidal velocity profile with respect to a time duration. Controlling activation includes controlling flow of a hydraulic fluid in the hydraulic power unit so as to control the corresponding trapezoidal velocity profile with respect to the time duration of the corresponding piston assembly to obtain a predefined flow rate of the fluid medium from the pumping unit.

16 Claims, 6 Drawing Sheets

(51) Int. Cl.
*F04B 23/06* (2006.01)
*F04B 49/22* (2006.01)
*B01D 61/02* (2006.01)

(56) References Cited

U.S. PATENT DOCUMENTS

| | | | |
|---|---|---|---|
| 4,009,860 A | 3/1977 | Lingnau | |
| 4,434,056 A | 2/1984 | Keefer | |
| 4,459,952 A | 7/1984 | Holstein | |
| 4,526,340 A | 7/1985 | Kolchinsky et al. | |
| 5,339,857 A | 8/1994 | Scallan et al. | |
| 5,542,384 A | 8/1996 | Rosenmann et al. | |
| 6,017,200 A * | 1/2000 | Childs | B01D 61/06 417/390 |
| 6,470,683 B1 | 10/2002 | Childs et al. | |
| 6,652,741 B1 * | 11/2003 | Marinzet | F04B 9/113 210/101 |
| 6,773,226 B2 | 8/2004 | Al-Hawaj | |
| 6,841,076 B1 | 1/2005 | Wobben | |
| 7,415,937 B2 | 8/2008 | Giesler et al. | |
| 7,634,911 B2 | 12/2009 | Brinkman | |
| 7,905,088 B2 | 3/2011 | Stephenson et al. | |
| 8,186,154 B2 | 5/2012 | Nelson et al. | |
| 2007/0246678 A1 | 10/2007 | Michaels | |
| 2011/0017310 A1 | 1/2011 | Eriksson | |
| 2012/0067432 A1 | 3/2012 | Vigholm et al. | |
| 2012/0118810 A1 | 5/2012 | Giles et al. | |
| 2013/0082000 A1 * | 4/2013 | d'Artenay | B01D 61/025 210/651 |
| 2014/0154099 A1 * | 6/2014 | Sivaramakrishnan | F04B 1/00 417/53 |

FOREIGN PATENT DOCUMENTS

| | | |
|---|---|---|
| EP | 292267 A2 | 11/1988 |
| JP | 2005195081 A | 7/2005 |
| JP | 2010063976 A | 3/2010 |
| WO | 03051598 A1 | 6/2003 |
| WO | 2007146321 A1 | 12/2007 |
| WO | 2009151174 A1 | 12/2009 |
| WO | 2010030723 A1 | 3/2010 |
| WO | 2012085326 A1 | 6/2012 |

OTHER PUBLICATIONS

Childs et al., "VARI-RO Direct Drive Engine Study", Final Technical Report, Science Applications International Corporation, Desalination Research and Development Program Report No. 33, Sep. 1998, 54 Pages.

Stover, "Energy Recovery Devices for Seawater Reverse Osmosis", INDEPTH Cover story, Everything About Water, Nov. 2006, pp. 40-46.

Jiaxi et al., "Energy Recovery Device with a Fluid Switcher for Seawater Reverse Osmosis System", Chinese Journal of Chemical Engineering, vol. 16, Issue 2, Apr. 2008, pp. 329-332.

"GE Introduces Major Energy Efficiency Breakthrough for Desalination Plants", General Electrical, Jul. 2, 2012, Downloaded from Internet:<http://www.businesswire.com/news/home/20120702005198/en/GE-Introduces-Major-En> on Jun. 3, 2013, 4 Pages.

Contreras, "An Energy Recovery Device for Small-Scale Seawater Reverse Osmosis Desalination", A Doctoral Thesis, Submitted in partial Fulfilment of the Requirements, for the Award of Doctor of Philosophy of Loughborough University, pp. 1-146, Dec. 9, 2009.

Unofficial English translation of Chinese Office Action issued in connection with corresponding CN Application No. 201280047713.2 on Feb. 9, 2015.

Non-Final Office Action issued in connection with corresponding U.S. Appl. No. 13/250,674 on Mar. 2, 2016.

US Non-Final Office Action issued in connection with related U.S. Appl. No. 13/250,674 on Jul. 20, 2016.

US Final Office Action issued in connection with Related U.S. Appl. No. 13/693,743 on Jun. 28, 2016.

U.S. Appl. No. 13/250,674, filed Sep. 30, 2011, Willard D. Childs.

U.S. Appl. No. 13/250,463, filed Sep. 30, 2011, Matthew D. d'Artenay et al.

U.S. Appl. No. 13/693,762, filed Dec. 4, 2012, Shyam Sivaramakrishnan et al.

U.S. Appl. No. 13/693,743, filed Dec. 4, 2012, Dean David Marschke.

* cited by examiner

SYSTEM AND METHOD FOR CONTROLLING MOTION PROFILE OF PISTONS

CROSS-REFERENCE TO RELATED APPLICATIONS

This U.S. Patent Application claims priority from U.S. patent application Ser. No. 13/693,743, filed on Dec. 4, 2012, entitled "ROTARY CONTROL VALVE FOR REVERSE OSMOSIS FEED WATER PUMP WITH ENERGY RECOVERY", and U.S. patent application Ser. No. 13/693,762, filed on Dec. 4, 2012, entitled "PUMPING SYSTEM WITH ENERGY RECOVERY AND REVERSE OSMOSIS SYSTEM".

BACKGROUND

Typically, an integrated pump and energy recovery system is used to pump an input stream of fluid for purification through a membrane or filter, such as a reverse osmosis membrane, at a higher pressure. A stream of brine or other concentrated unpurified material is then discharged under pressure from such a membrane or filter. Typically energy is recovered from the discharge stream still under pressure, and then such recovered energy is used for a useful purpose, for example, to reduce the amount of energy that the pump would otherwise have to expend in order to pump the input stream of fluid into the system, thereby making operation of the purification system more efficient.

When a semi-permeable membrane divides two fluids of different salinities, osmosis occurs. To achieve equilibrium of the chemical potential across the membrane, liquid flows through the membrane into the more concentrated solution. This flow continues until concentrations on either side of the membrane are equal, unless the osmotic pressure is reached. Reverse osmosis (RO) is a membrane-technology filtration method that removes many types of large molecules and ions from solutions by applying pressure to the solution when it is on one side of the selective membrane. The result is that the solute is retained on a pressurized side of the membrane and the pure solvent is allowed to pass to the other side of the membrane.

Efficiency of the reverse osmosis process may be improved by recovering energy from the high pressure waste brine. Known methods of pumping and of energy recovery include, for example, some combination of: plunger pumps with belt drives and pulsation dampeners, centrifugal pumps, sumps and sump pumps, reverse flow pump and Pelton wheel energy recovery turbines, hydraulic turbo chargers, flow work exchangers, and variable frequency drives.

In an integrated pump and energy recovery system using a plurality of piston-cylinder arrangements and valves for pumping the fluid medium, there are issues associated with pressure drops and loss of energy efficiency. Energy loss due to pressure drop is affected by the flow rate of fluids through valves which in turn is dependent on the velocity profile of the cylinders' pistons. The velocity profile also has an effect on life of seals that abrade against moving pistons.

BRIEF DESCRIPTION

In accordance with one exemplary embodiment, a method is disclosed. The method includes driving a fluid pumping unit having a plurality of pumping cylinders via a plurality of hydraulic cylinders respectively of a hydraulic power unit. Driving the fluid pumping unit includes moving a corresponding piston assembly within each corresponding pumping cylinder between a top dead center and a bottom dead center within each corresponding pumping cylinder so as to intake a fluid medium into each corresponding pumping cylinder, eject the intake fluid medium from each corresponding pumping cylinder; intake brine into each corresponding pumping cylinder, and eject brine from each corresponding pumping cylinder during each stroke of the corresponding piston assembly between the top dead center and the bottom dead center. The method includes controlling activation of the hydraulic power unit such that each stroke of the corresponding piston assembly between the top dead center and the bottom dead center follows a corresponding trapezoidal velocity profile with respect to a time duration. Controlling activation includes controlling flow of a hydraulic fluid in the hydraulic power unit so as to control the corresponding trapezoidal velocity profile with respect to the time duration of the corresponding piston assembly to obtain a predefined flow rate of the fluid medium from the pumping unit.

In accordance with another exemplary embodiment, a system having a processor-based device is disclosed. The processor based device is configured to drive a fluid pumping unit having a plurality of pumping cylinders via a plurality of hydraulic cylinders respectively of a hydraulic power unit. Driving the fluid pumping unit includes moving a corresponding piston assembly within each corresponding pumping cylinder between a top dead center and a bottom dead center within each corresponding pumping cylinder so as to intake a fluid medium into each corresponding pumping cylinder, eject the intake fluid medium from each corresponding pumping cylinder; intake brine into each corresponding pumping cylinder, and eject brine from each corresponding pumping cylinder during each stroke of the corresponding piston assembly between the top dead center and the bottom dead center. The processor based device is further configured to control activation of the hydraulic power unit such that each stroke of the corresponding piston assembly between the top dead center and the bottom dead center follows a corresponding trapezoidal velocity profile with respect to a time duration. Controlling activation includes controlling flow of a hydraulic fluid in the hydraulic power unit so as to control the corresponding trapezoidal velocity profile with respect to the time duration of the corresponding piston assembly to obtain a predefined flow rate of the fluid medium from the pumping unit.

In accordance with another exemplary embodiment, a non-transitory computer readable medium having instructions to enable a processor-based state estimation module is disclosed.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

In accordance with the embodiments of the present invention, a method includes driving a fluid pumping unit having two or more pumping cylinders via two or more hydraulic cylinders respectively of a hydraulic power unit. The method further includes controlling activation of the hydraulic power unit such that each stroke of the corresponding piston assembly between the top dead center and the bottom dead center within each corresponding pumping cylinder follows a corresponding trapezoidal velocity profile with respect to a time duration. A predefined fluid flow rate of the fluid medium from the pumping unit may be obtained by moving pistons at appropriate velocities. It should be noted herein that the terms "piston assembly" and "piston" may be used interchangeably. In accordance with certain specific embodiments, a processor based control unit is used to control the fluid pumping unit via the hydraulic power unit. It is beneficial to optimize the velocity profile of moving pistons. Exemplary motion profiles of the pistons in the integrated pump and energy recovery system may enhance efficiency and reliability in certain operational scenarios.

Figure 1:
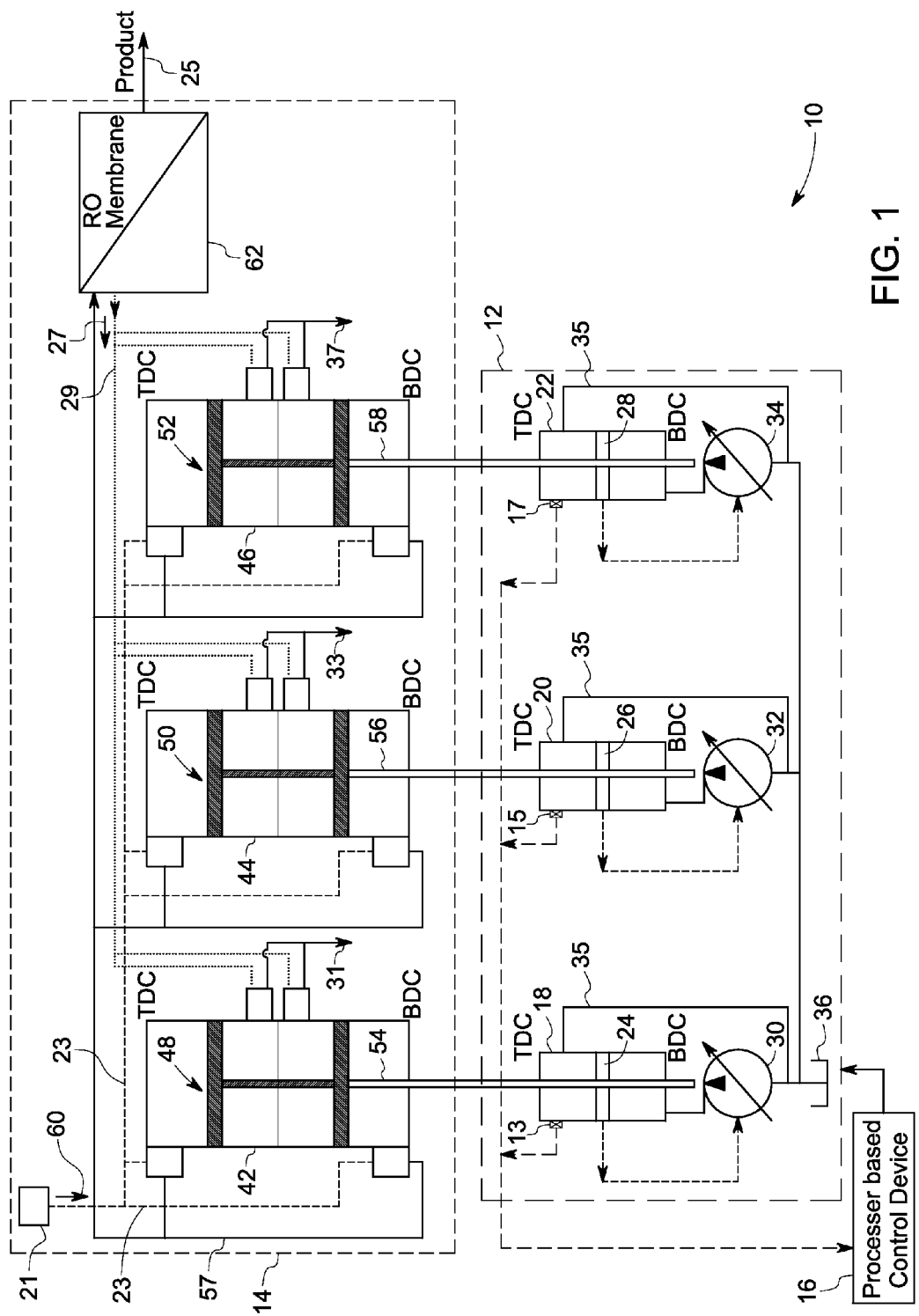
FIG. 1 is a diagrammatical representation of an integrated pump and energy recovery (IPER) system in accordance with an exemplary embodiment.

Referring to FIG. 1, an integrated pump and energy recovery (IPER) system 10 in accordance with an exemplary embodiment is diagrammatically disclosed. Such a system is particularly well suited for use in a reverse osmosis (RO) or similar desalting application. However, it is to be emphasized that the invention is not limited to reverse osmosis or similar applications. Rather, the invention may find applicability in any type of application where a fluid stream under pressure exists from which energy may be recovered for useful purposes, such as achieving for high pressure pumping. In accordance with one aspect of the invention, the system 10 utilizes hydraulic power transmission and control techniques for use within RO desalting facility.

The system 10 mainly includes a hydraulic power unit 12, a fluid pumping unit 14, and a processor-based control device 16. The hydraulic power unit 12 is coupled to the fluid pumping unit 14 and the processor-based control device 16. The hydraulic power unit 12 includes three hydraulic cylinders 18, 20, 22 having pistons 24, 26, 28 respectively. The pistons 24, 26, 28 move between a top dead center (TDC) and a bottom dead center (BDC) within the hydraulic cylinders 18, 20, 22 respectively. The hydraulic power unit 12 further includes three hydraulic pumps 30, 32, 34 coupled respectively to the hydraulic cylinders 18, 20, 22. The hydraulic pumps 30, 32, 34 are also coupled to a reservoir 36. In other embodiments, two or more hydraulic cylinders, hydraulic pumps, and reservoirs may be used depending on the application.

In the illustrated embodiment, the pistons 24, 26, 28 are double acting pistons. The hydraulic pumps 30, 32, 34 feed a hydraulic fluid 35 from the reservoir 36 alternately to either sides of the pistons 24, 26, 28 to move the pistons 24, 26, 28 between the TDC and BDC in the hydraulic cylinders 18, 20, 22.

In the illustrated embodiment, the fluid pumping unit 14 includes three pumping cylinders 42, 44, 46 having piston assemblies 48, 50, 52 respectively. The number of pumping cylinders 42, 44, 46 may vary depending on the application. The piston assemblies 48, 50, 52 move between a top dead center (TDC) and a bottom dead center (BDC) within the pumping cylinders 42, 44, 46 respectively. The piston assembly 48 is coupled via a piston rod 54 to the piston 24. Similarly, the piston assembly 50 is coupled via a piston rod 56 to the piston 26, and the piston assembly 52 is coupled via a piston rod 58 to the piston 28. The hydraulic power unit 12 drives the fluid pumping unit 14. Specifically, when the pistons 24, 26, 28 move to the TDC of the hydraulic cylinders 18, 20, 22, the piston assemblies 48, 50, 52 are also moved to the TDC of the pumping cylinders 42, 44, 46, and vice versa. In the illustrated embodiment, the piston assemblies 48, 50, 52 are also double acting pistons.

A fluid medium 60, for example seawater, brackish water, groundwater, boiler feed water or wastewater, flows from a feed water source 21 to the pumping cylinders 42, 44, 46 via low pressure feed pipes 23. The fluid medium 60 is pressurized within the pumping cylinders 42, 44, 46 and directed to a RO membrane 62 via high pressure feed pipes 22.

The membrane 62 separates the fluid medium into a low pressure stream of low-solute permeate 25 and a high pressure stream of high-solute brine 27. The brine 27 is directed back to the pumping cylinders 42, 44, 46, via high pressure brine pipes 29. Low-pressure brine, after being used to generate fluid medium pressure, is directed outwards from the pumping cylinders 42, 44, 46 via low pressure pipes 31, 33, 37.

As discussed herein, the desalted fluid medium is ejected from the RO membrane 62 and brine 27 is fed from the RO membrane 62 to the pumping cylinders 42, 44, 46 for recovering energy from brine 27. Advantageously, such energy recovery action reduces the overall energy that would otherwise have to be provided by the hydraulic power unit 12 in order to reciprocate the piston assemblies 48, 50, 52 during a pumping cycle and raise the pressure of the input fluid medium 60 upto a pressure needed by the RO membrane 62. In a preferred double-action embodiment, a first working volume on one side of the piston assemblies 48, 50, 52 diminishes during a forward stroke of the piston assemblies 48, 50, 52, and a second working volume on the other side of the piston assemblies 48, 50, 52 diminishes during a backward stroke of the piston assemblies 48, 50, 52. Similar principles are applicable to the hydraulic cylinders 18, 20, 22.

The processor-based control device 16 controls the fluid pumping unit 14 via the hydraulic power unit 12 to obtain the desired function during the fluid pumping and energy recovery operation. The piston assemblies 48, 50, 52 move between TDC and BDC of the respective pumping cylinders 42, 44, 46 in accordance with a predefined velocity profile. Such a velocity profile includes acceleration, constant velocity, and deceleration periods, as well as a short dwell time at the conclusion of each forward or backward stroke during which the piston assemblies 48, 50, 52 remain stopped. The velocity profile of each piston assembly and control features are explained in greater detail below with reference to subsequent figures. In a preferred embodiment, the three pumping cylinders 42, 44, 46 are disposed in parallel, such that the piston stroke of each pumping cylinder are phased appropriately compared to the piston stroke of the other pumping cylinders so as to minimize flow or pressure surges. For example, when three such pumping cylinders 42, 44, 46 are used, then the piston strokes are phased to be 120 degrees apart.

In the illustrated embodiment, the working of the system 10 involves feeding the fluid medium 60 to be desalted via the pumping cylinders 42, 44, 46 to the RO membrane 62 at a high pressure "$P_1$". The source 21 of the fluid medium 60 is typically provided at a low pressure "$P_0$". The pumping cylinders 42, 44, 46 thus increase the pressure of the input fluid from a low pressure $P_0$ to a high pressure $P_1$. The RO membrane 62 allows some of the fluid medium 60, e.g., 25-55% of the fluid medium, to pass there through and exit as permeate. The rest of the fluid medium exits the RO membrane 62 as a brine stream 27. The brine stream 27 is at a high pressure $P_2$, where pressure $P_2$ is less than $P_1$, but is still relatively high. The brine stream 27 is fed through the pumping cylinders 42, 44, 46 to recover the energy from the brine stream 27.

The control device 16 controls flow of the hydraulic fluid 35 in the hydraulic power unit 12 i.e. between the hydraulic cylinders 18, 20, 22 and the hydraulic pumps 30, 32, 34 to control the actuation of the piston assemblies 48, 50, 52 within the corresponding pumping cylinders 42, 44, 46. The velocity and time duration of the movement of the piston assemblies 48, 50, 52 within the corresponding pumping cylinders 42, 44, 46 is dependent on the flow rate of the hydraulic fluid 35 in the hydraulic power unit 12. In one embodiment, the control device 16 controls flow of the hydraulic fluid 35 in the hydraulic power unit 12 based on an open-loop technique. In a specific embodiment, the control device 16 controls actuation of the hydraulic pumps 30, 32, 34, for example, swash plates of the pumps 30, 32, 34 to control flow of the hydraulic fluid 35 in the hydraulic power unit 12. In one embodiment, the control device 16 controls flow of the hydraulic fluid 35 in the hydraulic power unit 12 based on a closed-loop technique. In a specific embodiment, the control device 16 controls flow of the hydraulic fluid 35 in the hydraulic power unit 12 based on an output from sensors 13, 15, 17 used to detect position of the pistons 24, 26, 28 within the corresponding hydraulic cylinders 18, 20, 22. In another specific embodiment, a sensor may be provided to detect position of the each piston assembly 48, 50, 52 within the corresponding pumping cylinders 42, 44, 46, and the control device 16 controls flow of the hydraulic fluid 35 in the hydraulic power unit 12 based on an output from sensors used to detect position of the piston assemblies 48, 50, 52 within the corresponding pumping cylinders 42, 44, 46.

The processor-based control device 16 may be a general purpose processor, a controller, or a server. The processor-based control device 16 may use software instructions from a disk or from a memory. The software may be encoded in any language, including, but not limited to, assembly language, Hardware Description Language, high level languages, and any combination or derivative of at least one of the foregoing languages. The processor-based control device 16 may also read instructions from a non-transitory encoded computer medium having instructions to control the hydraulic power unit 12 in accordance with the exemplary embodiments of the present invention.

Figure 2:
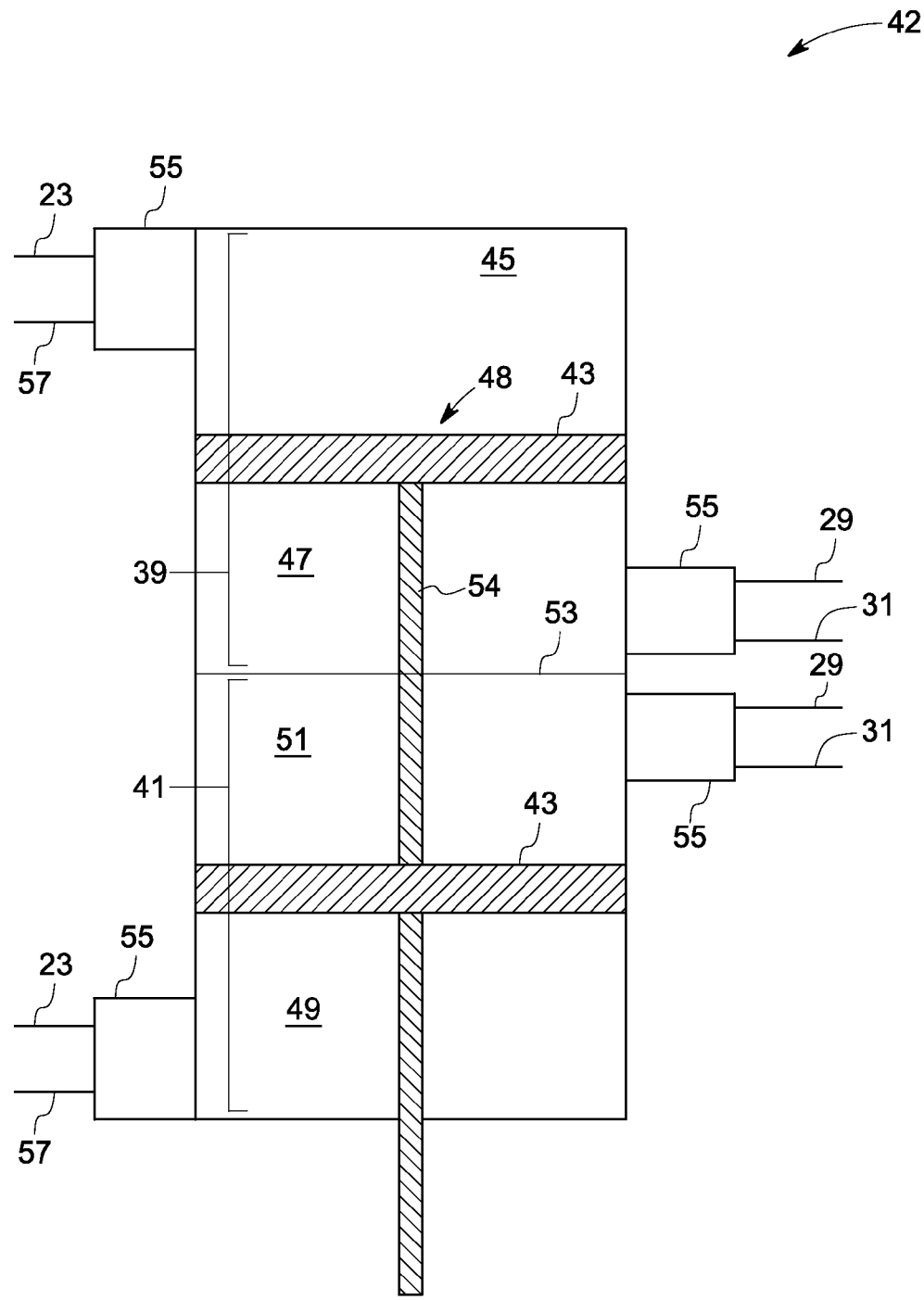
FIG. 2 is a diagrammatical representation of a cylinder of a fluid pumping unit of the IPER system in accordance with the embodiment of FIG. 1.

Referring to FIG. 2, a diagrammatical representation of the pumping cylinder 42, for example is disclosed. The pumping cylinder 42 has first and second piston chambers 39, 41. Each piston chamber 39, 41 has a piston 43. One piston 43 divides the piston chambers 39 into a fluid medium working chamber 45 and a concentrate working chamber 47. Similarly, the other piston 43 divides the piston chamber 41 into a fluid medium working chamber 49 and a concentrate working chamber 51. Preferably, the fluid medium working chambers 45, 49 are disposed at the ends of the pumping cylinder 42 and the concentrate working chambers 47, 51 are disposed at the middle of the pumping cylinder 42. Optionally, other configurations of pumping cylinder 42 may be used. The other pumping cylinders of the system may also have similar configurations.

The pistons 43 are mechanically coupled to each other by the connecting rod 54. The connecting rod 54 extends through a dividing wall 53 between the concentrate working chambers 47, 51 and out of the pumping cylinder 42 through bearing and seal assemblies (not shown) provided to minimize or prevent pressure or fluid leaks. The connecting rod 54 and the pistons 43 are collectively referred to as the piston assembly 48.

The pumping cylinder 42 includes a plurality of valves 55 that control the flow of liquid into and out of the pumping cylinders 42. Opening and closing of the valves 55 may be controlled by a controller in association with the movement of the piston assembly 48.

When the piston assembly 48 moves upwards to the TDC, the valves 55 are configured such that fluid medium in the working chamber 45 flows out to a high pressure feed pipe 57; brine flows into the concentrate working chamber 47 from the pipe 29; brine flows out of the concentrate working chamber 51 to the pipe 31; and, fluid medium flows into the working chamber 49 from the pipe 23. When the piston assembly 48 moves downwards to the TDC, the valves 55 are configured such that the fluid medium flows into the working chamber 45 from the pipe 23; brine flows out of the concentrate working chamber 47 to the pipe 31; the brine flows into the concentrate working chamber 51 from the pipe 29; and fluid medium flows out of the working chamber 49 to the pipe 57. The valves 55 are re-configured near or during dwell periods between push and pull strokes of the piston assembly 48. In such a way, energy is recovered from the pressurized brine to help provide pressurized feed water to the membrane.

Figure 3:
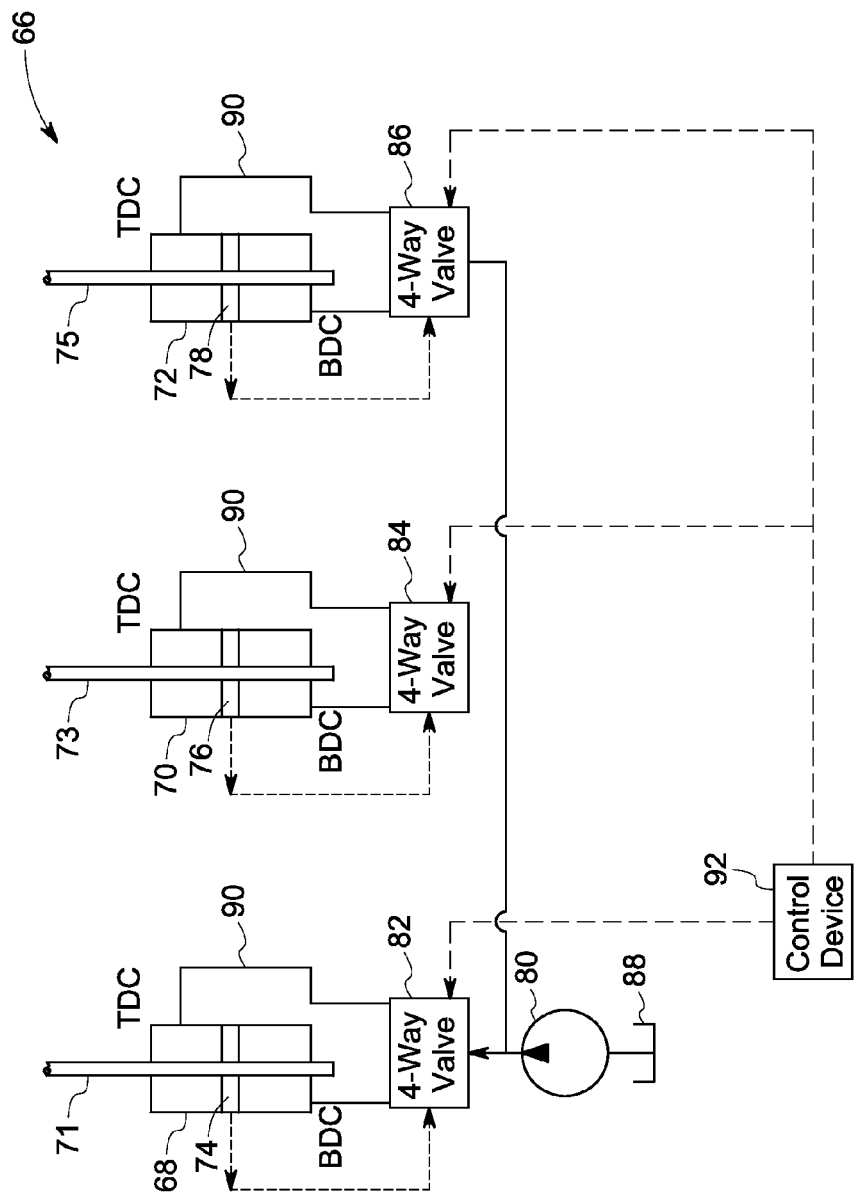
FIG. 3 is a diagrammatical representation of a hydraulic power unit in accordance with another exemplary embodiment.

Referring to FIG. 3, a hydraulic power unit 66 in accordance with another exemplary embodiment is diagrammatically disclosed. The hydraulic power unit 66 includes three hydraulic cylinders 68, 70, 72 having pistons 74, 76, 78 respectively. The pistons 74, 76, 78 are coupled respectively to piston rods 71, 73, 75 respectively. The pistons 74, 76, 78 move between a top dead center (TDC) and a bottom dead center (BDC) within the hydraulic cylinders 68, 70, 72 respectively. The hydraulic power unit 66 further includes a hydraulic pump 80 coupled via three four-way valves 82, 84, 86 to the corresponding hydraulic cylinders 68, 70, 72. Although four-way valves are illustrated, in other embodiments, other types of flow control devices are also envisioned. The hydraulic pump 80 is also coupled to a reservoir 88. The four-way valves 82, 84, 86 controls flow of a hydraulic fluid 90 between the hydraulic pump 80 and the three hydraulic cylinders 68, 70, 72. It should be noted herein that the number of hydraulic cylinders, valves, hydraulic pumps, and reservoirs may vary depending on the application.

The hydraulic pump 80 feeds the hydraulic fluid 90 from the reservoir 88 alternately to either sides of the pistons 74, 76, 78 via the corresponding 4-way valves 82, 84, 86 to move the pistons 74, 76, 78 between the TDC and BDC in the corresponding hydraulic cylinders 68, 70, 72.

In the illustrated embodiment, a control device 92 controls flow of the hydraulic fluid 90 in the hydraulic power unit 66 i.e. between the hydraulic cylinders 68, 70, 72 and the hydraulic pump 80 to control the actuation of the pistons within the corresponding pumping cylinders (not shown). In one embodiment, the control device 16 controls flow of the hydraulic fluid 90 in the hydraulic power unit 66 based on an open-loop technique. In a specific embodiment, the control device 16 controls actuation of the four-way valves 82, 84, 86 to control flow of the hydraulic fluid 90 in the hydraulic power unit 66. In one embodiment, the control device 92 controls flow of the hydraulic fluid 90 in the hydraulic power unit 66 based on a closed-loop technique.

The motion profiles of the pistons in accordance with embodiments of the present invention discussed herein are designed to create equitable distribution of hydraulic fluid flow through the three hydraulic valves 82, 84, 86. The equitable distribution of the hydraulic fluid flow, facilitates to minimize peak flow of hydraulic fluid through valves 82, 84, 86. As a result, energy losses through the valves 82, 84, 86 are minimized. Such minimal energy losses permits use of smaller flow control valves having lower cost, lower leaks and higher controllability.

Figure 4:
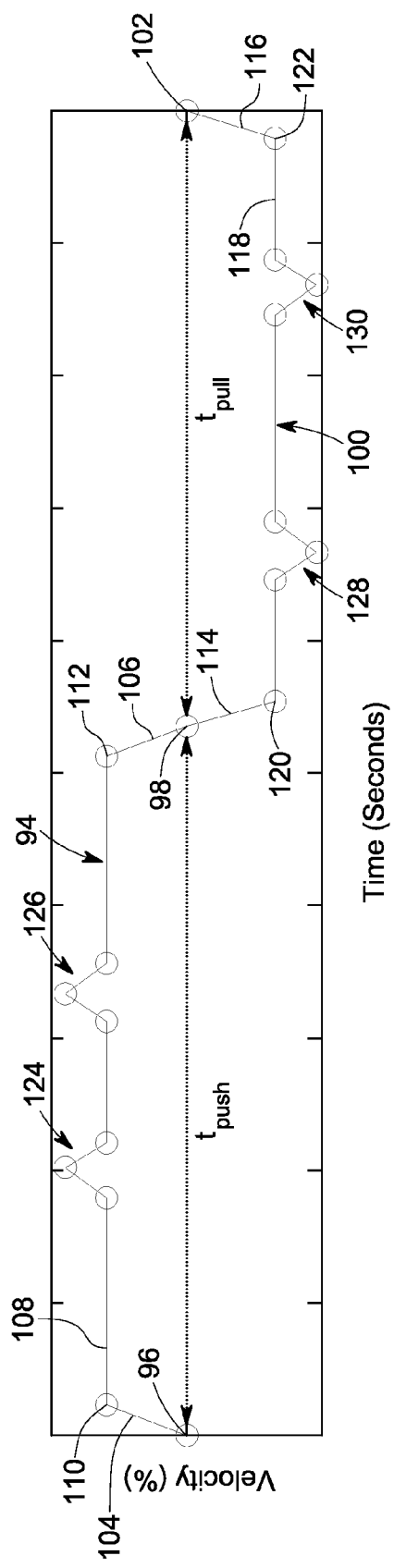
FIG. 4 is a graph illustrating variation of piston velocity expressed as a percentage with respect to time duration in seconds in accordance with an exemplary embodiment.

Referring to FIG. 4, a graph illustrating variation of piston velocity expressed as a percentage (represented by the vertical axis) with respect to time duration expressed in seconds (represented by horizontal axis) is disclosed in accordance with an exemplary embodiment. The graph is explained in conjunction with FIG. 1. A velocity profile of the piston assembly 48 in the pumping cylinder 42, for example, with respect to time duration is discussed herein. It should be specifically noted herein that all pistons of the pumping unit 14 follow a similar velocity profile.

A first trapezoidal velocity profile 94 extending from a point 96 to a point 98 is representative of a "push stroke" of the piston assembly 48 from BDC to TDC in the pumping cylinder 42. A second trapezoidal velocity profile 100 extending from the point 98 to a point 102 is representative of a "pull stroke" of the piston assembly 48 from TDC to BDC in the pumping cylinder 42.

The first trapezoidal velocity profile 94 includes a first ramp-up velocity profile 104, a first ramp-down velocity profile 106, and a first steady state velocity profile 108. The first ramp-up velocity profile 104 extends from the point 96 to a point 110 and is representative of acceleration of movement of the piston assembly 48 from the BDC towards TDC. The first steady state velocity profile 108 extends from the point 110 to a point 112 and is representative of steady state velocity of movement of the piston assembly 48 from the BDC towards TDC. The first ramp-down velocity profile 106 extends from the point 112 to the point 98 and is representative of deceleration of movement of the piston assembly 48 from the BDC to TDC.

The second trapezoidal velocity profile 100 includes a second ramp-up velocity profile 114, a second ramp-down velocity profile 116, and a second steady state velocity profile 118. The second ramp-up velocity profile 114 extends from the point 98 to a point 120 and is representative of acceleration of movement of the piston assembly 48 from TDC towards BDC. The second steady state velocity profile 118 extends from the point 120 to a point 122 and is representative of steady state velocity of movement of the piston assembly 48 from the TDC towards BDC. The second ramp-down velocity profile 116 extends from the point 122 to the point 102 and is representative of deceleration of movement of the piston assembly 48 from the TDC to BDC. In one embodiment, the first trapezoidal velocity profile 94 is same as the second trapezoidal velocity profile 100. In another embodiment, the first trapezoidal velocity profile 94 is different from the second trapezoidal velocity profile 100.

In accordance with the embodiments of the present invention, velocity profile of each piston assembly 48, 50, 52 of the pumping unit 14 may be maintained same. In the illustrated embodiment, the piston assembly 48 is moved from the bottom dead center to the top dead center (push stroke) within pumping cylinder 42 at a first velocity, and from top dead center to the bottom dead center (pull stroke) at a second velocity. In one embodiment, the first velocity is different from the second velocity. In a specific embodiment, the first velocity is less than the second velocity. In other words, velocity during push stroke of the piston assembly 48 is less than the velocity of the piston assembly 48 during pull stroke. Such a difference in velocity during push and pull strokes facilitates to compensate for a large piston area available during push stroke and also attain equal water flow rate from the system 10 during both and push and pull stroke of the piston assembly 48. In another embodiment, the first velocity is equal to the second velocity. In another embodiment, the first velocity may be greater than the second velocity. Velocity of the piston assembly 48 during push stroke is represented by:

$$V_{push} = \frac{V_{max}}{3K} \quad (1)$$

$$V_{max} = \frac{Q_w}{A_{wc-pull}} \quad (2)$$

$$k = \frac{A_{wc-push}}{A_{wc-pull}} \quad (3)$$

where $V_{push}$ is the steady-state velocity of the piston, $V_{max}$ is the theoretical velocity of pumping flow due to movement of one piston assembly in the pumping cylinder, K is the ratio of effective area of push and pull sides of the piston assembly in the pumping cylinder, $A_{we-push}$ is effective area at the push side of the piston assembly in the pumping cylinder, $A_{we-pull}$ is effective area at the pull side of the piston assembly in the pumping cylinder.

Velocity of the piston assembly 48 during pull stroke is represented by:

$$V_{pull} = \frac{V_{max}}{3} \quad (4)$$

In accordance with the embodiments of the present invention, the piston assembly 48 is moved from the bottom dead center to the top dead center (push stroke) within the pumping cylinder 42 in a first time duration ($t_{push}$) and from the top dead center to the bottom dead center (pull stroke) in a second time duration ($t_{pull}$). In one embodiment, the first time duration is different from the second time duration. Specifically, in one embodiment, the first time duration ($t_{push}$) is greater than the second time duration ($t_{pull}$). In other words, time duration of push stroke of the piston assembly 48 is greater than the time duration of the piston assembly 48 during pull stroke. Such a difference in time duration during push and pull strokes facilitates to compensate for relatively lower velocity during push stroke of the piston assembly 48 and ensures equal piston displacement during both push and pull strokes. In another embodiment, the first time duration is equal to the second time duration. In yet another embodiment, the first time duration may be less than the second time duration. Time durations of the push and pull strokes are represented by the following relations:

$$V_{push} \times t_{push} = V_{pull} \times t_{pull} \quad (5)$$

$$t_{push} + t_{pull} = T \quad (6)$$

$$t_{push} = \frac{KT}{K+1} \quad (7)$$

$$t_{pull} = \frac{T}{K+1} \quad (8)$$

where T is the total time duration for the push and pull strokes of one cycle movement of the piston assembly 48. It should be noted herein that total time duration "T" is determined based on an output flow rate required from the system.

In accordance with certain embodiments of the present invention, a first ramp-up time associated with the first ramp-up velocity profile 104, and a first ramp-down time associated with the first ramp-down velocity profile 106, is greater than a second ramp-up time associated with the second ramp-up velocity profile 114, and a second ramp-down time associated with the second ramp-down velocity profile 116. Such a difference in ramp-up time duration and ramp-down time duration during push and pull strokes facilitates to compensate for relatively lower velocity during push stroke of the piston assembly 48 and ensures equal piston displacement during both push and pull strokes. The ramp-up time, the first ramp-down time, the second ramp-up time, and the second ramp-down time are illustrated and discussed in greater detail with reference to a subsequent figure. A time duration including the first ramp-up time and the first ramp down time is indicated by $t_{ramp-push}$ and a time duration including the second ramp-up time and the second ramp-down time is indicated by $t_{ramp-pull}$ and represented by the following relations:

$$V_{push} \times t_{ramp-push} = V_{pull} \times t_{ramp-pull} \quad (9)$$

$$t_{ramp-push} = k \times t_{ramp-pull} \quad (10)$$

where $t_{ramp-pull}$ may be user defined.

It is reiterated herein that although the illustrated embodiment is discussed specifically with reference to piston assembly 48, other piston assemblies 50, 52 also follow a similar trapezoidal velocity profile during each stroke. Due to the 120 degrees offset of the trapezoidal velocity profile of the three piston assemblies 48, 50, 52, when one piston assembly changes direction from one stroke to another stroke, for example from a push stroke to a pull stroke, the two remaining piston assemblies undergo mutually opposite strokes. For example, if the piston assembly 48 is at TDC in the cylinder 42 and changing direction from a push stroke to a pull stroke, the other two piston assemblies 50, 52 undergo mutually opposite strokes i.e. one piston assembly undergoes a pull stroke and the other piston assembly undergoes a push stroke. It should be noted herein that at the time instant when a piston assembly undergoes change in direction, velocity of the particular piston assembly is zero, and hence velocity profiles of the other two piston assemblies are controlled such that sum of flow rates of the fluid medium ejected from the corresponding cylinders having the two remaining piston assemblies compensates for the loss in flow rate from the cylinder whose piston assembly is undergoing change in direction. For example, if the piston assembly 48 is undergoing a change in direction at the TDC from a push stroke to a pull stroke in the cylinder 42, then the velocity profiles of the other two piston assemblies 50, 52 are controlled such that sum of flow rates of the fluid medium ejected from the cylinders 44, 46 compensates for the piston assembly 48 undergoing change in direction.

With reference to the first trapezoidal velocity profile 94, the piston assembly 48 follows the first steady state velocity profile 108 during the push stroke. When one of the remaining piston assemblies, for example piston assembly 50 changes direction from one stroke to another stroke, the velocity of the piston assembly 48 is increased from a steady state velocity to a predefined higher velocity and then reduced to the steady state velocity as represented by the peak triangle 124. Similarly when the other piston assembly, for example piston 52 changes direction from one stroke to another stroke, the velocity of the piston assembly 48 is increased from a steady state velocity to a predefined higher velocity and then reduced to the steady state velocity as represented by the peak triangle 126.

With reference to the second trapezoidal velocity profile 100, the piston assembly 48 follows the second steady state velocity profile 118 during the pull stroke. When one of the remaining piston assemblies, for example piston assembly 50 changes direction from one stroke to another stroke, the velocity of the piston assembly 48 is increased from a steady state velocity to a predefined higher velocity and then reduced to the steady state velocity as represented by the peak triangle 128. Similarly when the other piston assembly, for example piston assembly 52 changes direction from one stroke to another stroke, the velocity of the piston assembly 48 is increased from a steady state velocity to a predefined higher velocity and then reduced to the steady state velocity as represented by the peak triangle 130. It should be noted herein that other two piston assemblies 50, 52 also follow similar trapezoidal velocity profiles as discussed herein. Such a control of the first steady state velocity profile 108 and the second steady state velocity profile 118 facilitates to ensure a predefined water flow rate to the membrane and equal piston displacement during push stroke and pull stroke of the piston assembly. In some embodiments, the predefined water flow rate may be a constant flow rate to the membrane.

Figure 5:
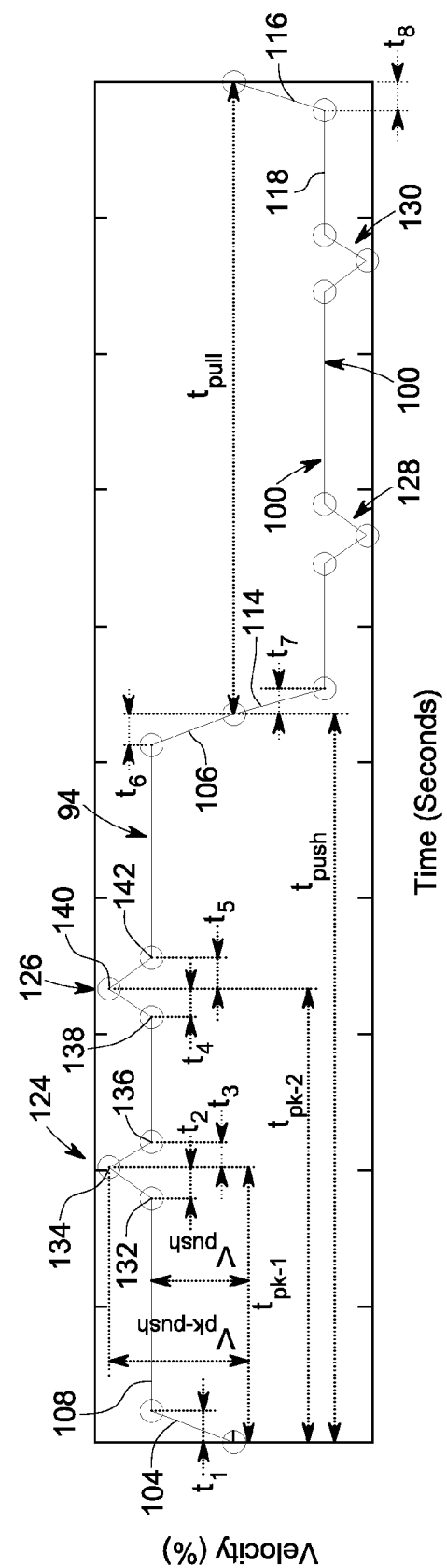
FIG. 5 is a graph illustrating variation of piston velocity expressed as a percentage with respect to time duration in seconds in accordance with an exemplary embodiment.

Referring to FIG. 5, a graph illustrating variation of piston velocity expressed as a percentage (represented by the vertical axis) with respect to time duration expressed in seconds (represented by horizontal axis) is disclosed in accordance with embodiment of FIG. 4. In the illustrated embodiment, various time durations associated with the first trapezoidal velocity profile 94 and the second trapezoidal velocity profile 100 are indicated. In the illustrated graph, $t_1$ (also referred as $t_{ramp-push}$) is representative of the first ramp-up time associated with the first ramp-up velocity profile 104, $t_6$ (also referred as $t_{ramp-push}$) is representative of the first ramp-down time associated with the first ramp-down velocity profile 106, $t_7$ (also referred as $t_{ramp-pull}$) is representative of the second ramp-up time associated with the second ramp-up velocity profile 114, $t_8$ (also referred as $t_{ramp-pull}$) is representative of the second ramp-down time associated with the second ramp-down velocity profile 116.

Further, $t_2$ is representative of a ramp-up time associated with a ramp-up in velocity from a point 132 on the first steady state velocity profile 108 to a point 134 indicative of a predefined peak velocity, $t_3$ is representative of a ramp-down time associated with a ramp-down in velocity from the point 134 to a point 136 on the first steady state velocity profile 108. Further, $t_4$ is representative of a ramp-up time associated with a ramp-up in velocity from a point 138 on the first steady state velocity profile 108 to a point 140 indicative of the predefined peak velocity, $t_5$ is representative of a ramp-down time associated with a ramp-down in velocity from the point 140 to a point 142 on the first steady state velocity profile 108. Further, $t_{pk-1}$ is representative of the time duration required by the piston assembly to move from a zero velocity to the point 134 representative of the predefined peak velocity, $t_{pk-2}$ is representative of the time duration required by the piston assembly to move from a zero velocity to the point 140 representative of the predefined peak velocity, $t_{push}$ is representative of the time duration required by the piston assembly to complete the push stroke. Further, $V_{push}$ is representative of steady state velocity associated with the first steady state velocity profile 108 and $V_{pull}$ is representative of the steady state velocity associated with the second steady state velocity profile 118, $V_{pk-push}$ is representative of peak velocity associated with the points 134, 140, and similarly $V_{pk-pull}$ is representative of the peak velocity associated with the second steady state velocity profile 118. It should be noted herein that although certain time durations are discussed only with reference to the first trapezoidal velocity profile 94, similar aspects are applicable also to the second trapezoidal velocity profiles 100.

The time durations $t_{pk-1}$ and $t_{pk-2}$ are represented further by the following relations:

$$t_{pk-1} = t_{push} - \frac{T}{3} \quad (11)$$

$$t_{pk-2} = \frac{T}{3} \quad (12)$$

As discussed earlier, at the time instant when a piston assembly undergoes change in direction, velocity of the particular piston assembly is zero, and hence velocity profiles of the other two piston assemblies are controlled such that sum of flow rates of the fluid medium ejected from the corresponding cylinders having the two remaining piston assemblies compensates for the piston assembly undergoing change in direction. Such a compensation is achieved by matching the sum of flow rate slopes of the two corresponding cylinders having the two remaining piston assemblies with the flow rate slope of the cylinder having the piston assembly undergoing change in direction. If all the ramp time durations follow same profile for each trapezoidal velocity profile, then:

$$K(V_{pk-push} - V_{push}) + (V_{pk-pull} + V_{pull}) = \frac{V_{max}}{3} \quad (13)$$

In accordance with the embodiments of the present invention, net displacement of the piston assembly is same for both push and pull strokes. It should be noted herein that displacement is referred to as an area under the velocity curve. Values of the various velocities and time durations are chosen in such a way that area under the velocity curve for both push and pull strokes are same. In order to ensure that piston displacement during peak velocity transitions are equal, area under the velocity peak triangles, for example triangles 124, 126 should be equal to triangles 128,130. Since total time duration associated with the velocity peak triangles, for example (t1+t2), (t3+t4), . . . ) are equal, then:

$$V_{pk-push} - V_{push} = V_{pk-pull} - V_{pull} \quad (14)$$

Solving equations (13) and (14), following relations are obtained:

$$V_{pk-push} = \frac{V_{max}}{3} \times \frac{(2k+1)}{K(K+1)} \quad (15)$$

$$V_{pk-pull} = \frac{V_{max}}{3} \times \frac{2(1-K)}{(1+k)} \quad (16)$$

Figure 6:
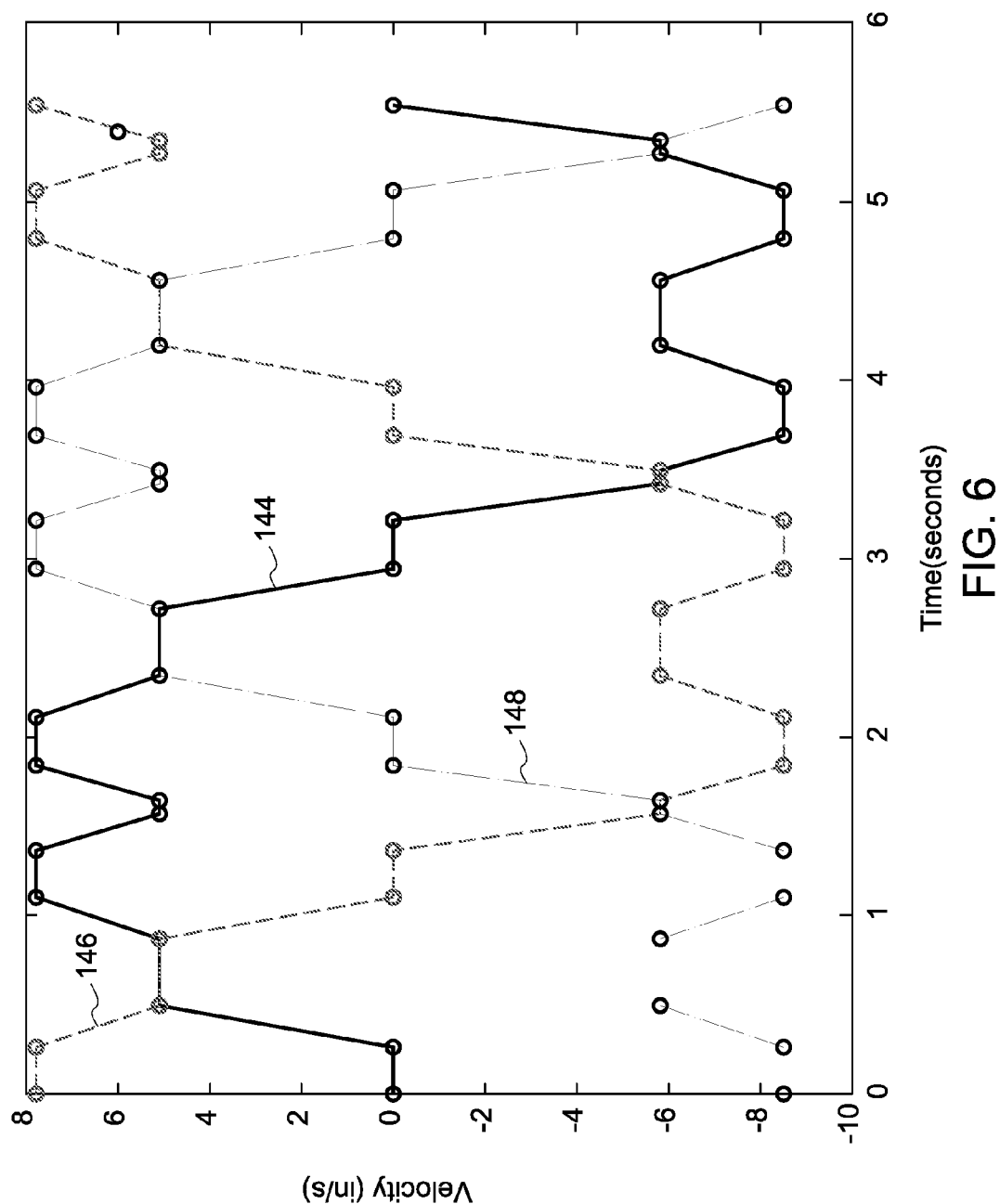
FIG. 6 is a graph illustrating variation of piston velocity with respect to time duration in accordance with an exemplary embodiment.

Referring to FIG. 6, a graph illustrating variation of piston velocity expressed as a percentage (represented by the vertical axis) with respect to time duration expressed in seconds (represented by horizontal axis) is disclosed in accordance with an exemplary embodiment. Curves 144, 146, 148 are representative of velocity profiles of three piston assemblies respectively disposed in corresponding pumping cylinders of a pumping unit. As discussed herein, due to the 120 degrees offset of the trapezoidal velocity profiles of the three piston assemblies, when one piston assembly changes direction from one stroke to another stroke, for example from a push stroke to a pull stroke, the two remaining piston assemblies undergoes mutually opposite strokes. In the illustrated embodiment, the velocity profiles include dwell time between push and pull strokes of the pistons, whereas velocity profiles shown in FIGS. 4 and 5 do not include dwell time between push and pull strokes of the pistons.

In accordance with the embodiments discussed herein, the exemplary motion profiles of the pistons facilitate to ensure a predefined flow rate of the fluid medium from the pumping unit. Such a predefined flow rate of the fluid medium (water) is necessary to avoid pressure fluctuations of flow which may damage RO membranes. In certain embodiments, the exemplary velocity profiles of the piston assemblies are designed considering areas of each piston assembly on push and pull side within the corresponding pumping cylinder are different. The exemplary motion profile of the piston assembly enables total displacement of the piston assembly during push and pull strokes to be equal. Such a control of the displacement of the piston assembly during each stroke enables to overcome issues associated with drifting of position of the piston assembly over course of time and eventual ramming of the piston assembly against the peripheral wall of the cylinder.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method comprising:
driving a fluid pumping unit comprising a plurality of pumping cylinders via a plurality of hydraulic cylinders respectively of a hydraulic power unit; wherein driving the fluid pumping unit comprises:
moving a corresponding piston assembly among a plurality of piston assemblies, within each corresponding pumping cylinder between a top dead center and a bottom dead center so as to intake a fluid medium into each corresponding pumping cylinder, eject the intake fluid medium from each corresponding pumping cylinder, intake brine into each corresponding pumping cylinder, and eject brine from each corresponding pumping cylinder during each stroke of the corresponding piston assembly between the top dead center and the bottom dead center; and controlling activation of the hydraulic power unit such that each stroke of the corresponding piston assembly between the top dead center and the bottom dead center follows a corresponding trapezoidal velocity profile; wherein the corresponding trapezoidal velocity profile comprises a first trapezoidal velocity profile representative of movement of the corresponding piston assembly from the bottom dead center to the top dead center within each corresponding pumping cylinder, a second trapezoidal velocity profile representative of movement of the corresponding piston assembly from the top dead center to the bottom dead center, and a dwell time between the first trapezoidal velocity profile and the second trapezoidal velocity profile, wherein each of the first and second trapezoidal velocity profiles comprises a ramp-up velocity profile, a ramp-down velocity profile, and a steady state velocity profile with a plurality of peak velocity profiles, wherein each peak velocity profile is representative of an increase from a steady state velocity to a predefined higher velocity and then a decrease to the steady state velocity during a change in direction from one stroke to another stroke of at least one remaining piston assembly among the plurality of piston assemblies, wherein controlling activation further comprises:

controlling flow of a hydraulic fluid in the hydraulic power unit so as to control the corresponding trapezoidal velocity profile of the corresponding piston assembly to obtain a predefined flow rate of the fluid medium from the pumping unit.

2. The method of claim 1, wherein the controlling activation further comprises controlling at least one hydraulic pump to control flow of the hydraulic fluid in the hydraulic power unit.

3. The method of claim 1, wherein the controlling activation further comprises controlling a plurality of flow control valves to control flow of the hydraulic fluid in the hydraulic power unit.

4. The method of claim 1, further comprising moving the corresponding piston assembly within each corresponding pumping cylinder from the bottom dead center to the top dead center at a first velocity magnitude and moving the corresponding piston assembly from the top dead center to the bottom dead center at a second velocity magnitude.

5. The method of claim 4, wherein the first velocity magnitude is different from the second velocity magnitude.

6. The method of claim 4, wherein the first velocity magnitude is equal to the second velocity magnitude.

7. The method of claim 1, further comprising moving the corresponding piston assembly within each corresponding pumping cylinder from the bottom dead center to the top dead center in a first time duration and moving the corresponding piston assembly from the top dead center to the bottom dead center in a second time duration.

8. The method of claim 7, wherein the first time duration is different from the second time duration.

9. The method of claim 7, wherein the first time duration is equal to the second time duration.

10. The method of claim 1, further comprising obtaining the same piston displacement during each stroke of the corresponding piston assembly within each corresponding pumping cylinder.

11. The method of claim 1, wherein the first trapezoidal velocity profile is different from the second trapezoidal velocity profile.

12. The method of claim 1, wherein the first trapezoidal velocity profile is same as the second trapezoidal velocity profile.

13. The method of claim 1, wherein a first time duration is associated with the first trapezoidal velocity profile, and a second time duration is associated with the second trapezoidal velocity profile.

14. The method of claim 1, further comprising controlling the corresponding trapezoidal velocity profile with respect to the corresponding piston assembly based on movement of the one or more remaining piston assemblies.

15. The method of claim 1, wherein the controlling activation of the hydraulic power unit comprises operating the hydraulic power unit as a closed-loop system.

16. The method of claim 1, wherein the controlling activation of the hydraulic power unit comprises operating the hydraulic power unit as an open-loop system.

* * * * *